United States Patent
Brown et al.

[11] Patent Number: 5,821,872
[45] Date of Patent: Oct. 13, 1998

[54] INFORMATION DISPLAY APPARATUS

[76] Inventors: Allan M. Brown, 5235 Bégin, St. Hubert, Quebec, Canada, J3Y 2R2; Ann Seymour, 325 Neptune, Dorval, Quebec, Canada, H9S 2L5; James Anglehart, 4532 Old Orchard, Notre-Dame-de-Grace, Montreal, Quebec, Canada, H4A 3B7

[21] Appl. No.: 597,670

[22] Filed: Feb. 6, 1996

[51] Int. Cl.$^6$ .................................................. H04Q 1/00
[52] U.S. Cl. ..................................... 340/825.35; 341/23
[58] Field of Search .................. 340/825.35, 825.54, 340/825.22, 825.28, 825.29, 815.45; 341/22, 23; 345/172; 186/44; 364/400, 401; 395/201, 227; 200/317; 353/25; 235/375

[56] References Cited

U.S. PATENT DOCUMENTS

| | | |
|---|---|---|
| 3,757,037 | 9/1973 | Bialek . |
| 4,160,271 | 7/1979 | Grayson et al. .......................... 364/400 |
| 4,347,416 | 8/1982 | Ogden .................................... 200/317 |
| 4,351,591 | 9/1982 | Stockett ................................... 353/25 |
| 4,554,419 | 11/1985 | King ....................................... 200/317 |
| 4,750,151 | 6/1988 | Baus . |
| 4,937,586 | 6/1990 | Stevens et al. . |
| 4,964,043 | 10/1990 | Galvin . |
| 5,111,196 | 5/1992 | Hunt . |
| 5,175,542 | 12/1992 | Trotta ........................................ 341/22 |
| 5,200,909 | 4/1993 | Juergens . |
| 5,237,157 | 8/1993 | Kaplan .................................... 235/375 |
| 5,283,865 | 2/1994 | Johnson . |
| 5,351,186 | 9/1994 | Bullock et al. ......................... 395/201 |
| 5,442,348 | 8/1995 | Mushell ............................. 340/825.54 |
| 5,465,085 | 11/1995 | Caldwell et al. . |

*Primary Examiner*—Edwin C. Holloway, III
*Attorney, Agent, or Firm*—Swabey Ogilvy Renault

[57] ABSTRACT

A panel 15 has a plurality of keys 12 and associated LEDs 14. The panel 15 is divided up into product characteristic columns 16 and at least one recommended product column 18. The array of product characteristic selection keys are used for inputting at least one selection of a plurality of product characteristics. The LEDs associated with the product characteristic selection keys indicate selected ones of the plurality of product characteristics. A logic controller interprets the key presses and accordingly controls the illumination of the LEDs. Selection of a product characteristic from each of the categories 16 will typically cause at least one recommended product to be indicated in the group of products 18. Pressing on one of the keys 12 in column 18 can optionally cause an automatic indication of all product characteristics which can be associated with the selected product. A sheet containing the labeling information on the front panel may be replaceable and the logic controller may be reprogrammable to allow the same apparatus to be updated and reused.

17 Claims, 2 Drawing Sheets

INFORMATION DISPLAY APPARATUS

FIELD OF THE INVENTION

The present invention relates to an information display apparatus. More particularly, the present invention relates to an information display apparatus which can be used to help consumers select a product or become more familiar with a product at a point of product selection which operates by allowing a user to select product characteristics, the selection of product characteristics being analyzed to determine a recommended or suitable product among a plurality of products having the selectable product characteristics.

BACKGROUND OF THE INVENTION

In the case of many types of consumer products, a group of consumer products are made available on a store shelf which the consumer must choose from according to his or her needs. The consumer must rely on previous knowledge of the product or on the product packaging to choose the best product for the occasion. For example, a consumer may be choosing a bottle of wine produced by a given country, region or vineyard and, therefore, would need to know which bottles of wine would have the appropriate characteristics of taste and compatibility with certain types of food. Such information may be provided on the label of the wine bottles themselves, permitting the consumer to inspect the goods on the shelf and determine which product is best suited for the particular need.

Whether the product be wine, office paper, glue, motor oil, cosmetics or baby food, the consumer is typically faced with a somewhat difficult choice as to the particular suitability of a product for particular uses. Purchases of such products may take a little longer, since the packaging needs to be read before a selection can be made, otherwise there is the risk that the wrong product is selected.

In U.S. Pat. No. 5,111,196 granted to Hunt, there is shown an electronic information display module attachable to a store shelf which is capable of storing and displaying computer generated data corresponding to the price and related information regarding items of merchandise offered for sale on the shelf. Product characteristic selection is not made possible. In U.S. Pat. No. 5,283,865 granted to Johnson, there is shown a computer assisted parts sales system in which the part selection device electronically selects a particular part by navigating through part choices menus based on stored part specifications. The user interface controls the operation of the display apparatus and the part selection device so that each of the respective system parts are operatively coupled and related to one another. Johnson relates to a computer assisted parts sales system for use by a salesperson for obtaining a part number from a computerized catalog system.

SUMMARY OF THE INVENTION

It is an object according to the present invention to provide an information display apparatus which can be used at a point of product selection which will provide information about which products within a group are suitable based on selected product characteristics. It is furthermore an object of the present invention to provide such an apparatus which will give information on product characteristics for a particular product which is selected. It is yet another object of the present invention to provide such an information display apparatus which can be manufactured inexpensively such that it may be made available for the consumer's use at the store shelf where the products are on sale.

According to the invention, there is provided an information display apparatus comprising an array of product characteristic selection means for inputting at least one selection of a plurality of product characteristics, an array of selected product characteristic display means for indicating selected ones of the plurality of product characteristics, an array of recommended product display means for indicating at least one of a plurality of products having the plurality of product characteristics, and logic means for determining at least one recommended product to be displayed based on the product characteristic selection, and for controlling the selected product characteristic display means and the recommended product display means to display selected ones of the plurality of product characteristics and the recommended product.

Preferably, the apparatus further comprises an array of product selection means for selecting one of the plurality of products, the logic means determining which ones of the product characteristics are associated with the selected product and controlling the selected product characteristic display means to display determined ones of the plurality of product characteristics which can be associated with the selected product.

Preferably, the information display apparatus according to the invention has a small panel-like construction with a front surface consisting of an array of flat keys and an associated array of LEDs. Also preferably, the labeling of the keys and associated LEDs providing the product characteristic information or the recommended product information is achieved by providing a sheet on the surface of the apparatus board.

Also preferably, the information display apparatus records either which combination of key strokes were pressed by the public or at least which products were recommended so that the public's interest in gaining information about the plurality of products in the group can be obtained and used for marketing purposes Also preferably, the information display apparatus may comprise a sound generating device either for providing the recommended product display means and/or the selected product characteristic display means, or for providing small quantities of additional information useful for understanding the selected product or for understanding how the apparatus works.

BRIEF DESCRIPTION OF THE DRAWINGS

The invention will be better understood by way of the following detailed description of a preferred embodiment, with reference to the appended drawings in which.

DETAILED DESCRIPTION OF THE PREFERRED EMBODIMENT

Figure 1:
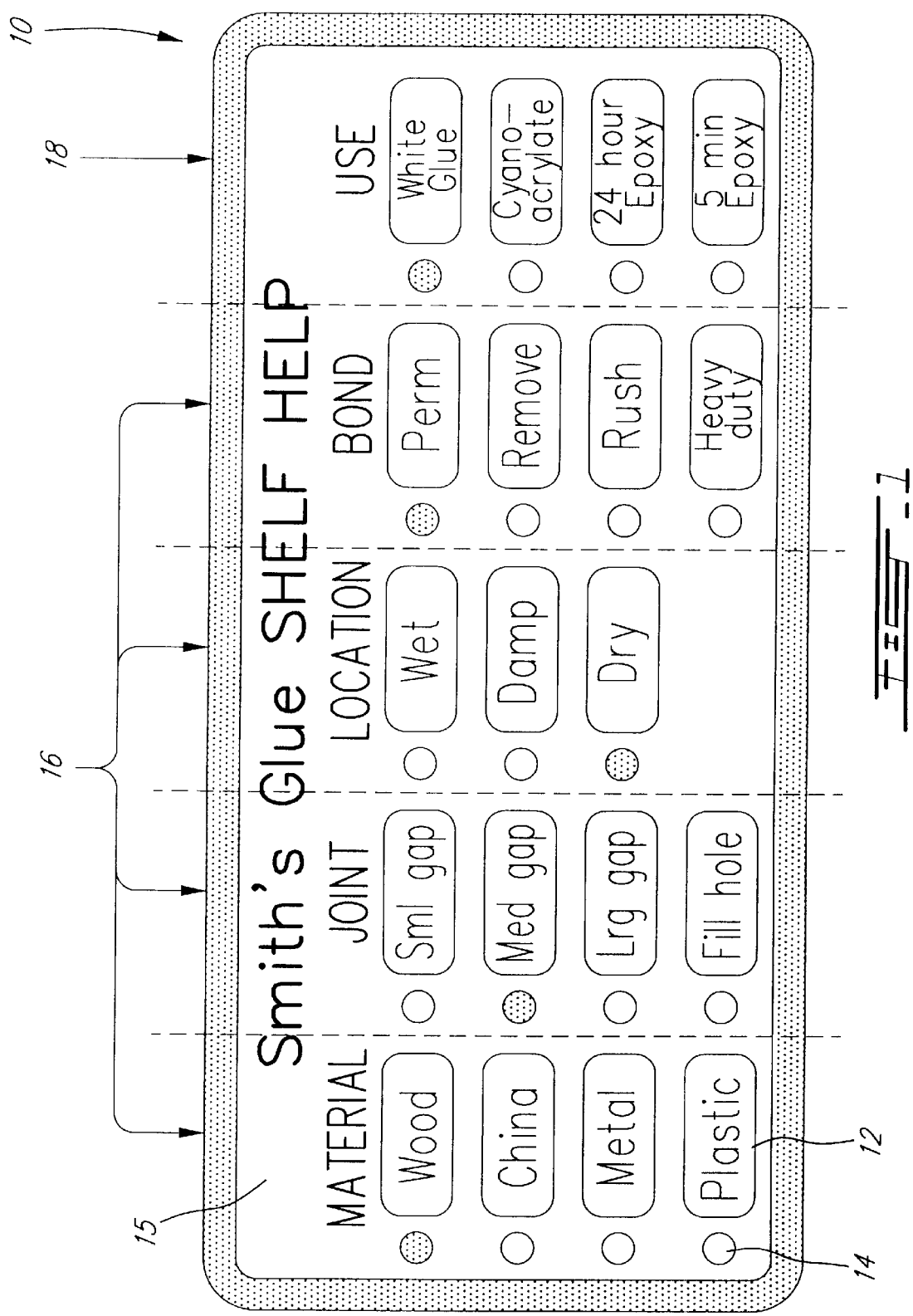
FIG. 1 is a front view of a keypad and display panel according to the preferred embodiment.

With reference to FIG. 1, the preferred embodiment is shown to comprise a front panel 15 of an information display apparatus 10 in which an array of keys 12 is associated with an array of LEDs 14. The front panel 15 is a printed sheet held in place by a plastic film cover, and the sheet may be changed as required. The keys and associated LEDs are arranged in two groups, namely, a plurality of columns 16 and a column 18. The columns 16 are for the product characteristics and column 18 is for the plurality of products. The embodiment is shown in a state in which a user of the apparatus has selected the appropriate glue for use with wood, for joining pieces with a medium gap, in which the wood is dry, and the bond is to be permanent. The displayed recommended product is white glue.

In the preferred embodiment, the user selects a product characteristic from each of the columns 16, at which point, one recommended product is displayed by illuminating the associated LED in column 18. The selection of characteristics in the columns 16 could be done in any order, i.e. not necessarily from left to right. According to the preferred embodiment, the user also has the option of pressing the "white glue" key in response to which the apparatus 10 will illuminate all appropriate characteristics of white glue, e.g. the bond type would be indicated as being both permanent and heavy duty, the location would be indicated as being dry and damp but not wet, and the joint type would be indicated as being all of the gap possibilities including the fill hole and the material would be indicated as being only wood. Thus, in the preferred embodiment, the user may use the apparatus 10 in a forward direction in order to obtain a recommended product based on selection product characteristics, and also in a reverse direction to find out which product characteristics apply to a particular selected product.

Figure 2:
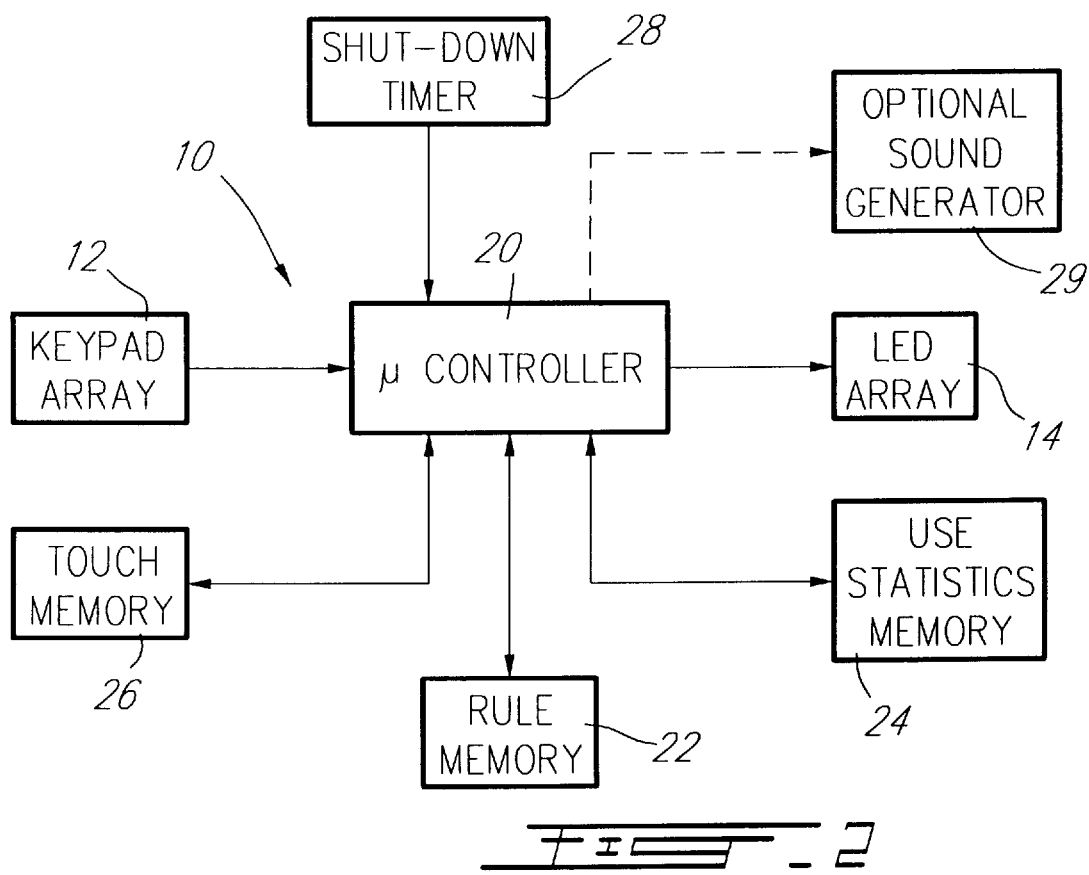
FIG. 2 is a schematic high level block diagram of the electronic circuit according to the preferred embodiment.

With reference to FIG. 2, operation of the electronic apparatus will be described. The keypad array 12, as is known in the art, includes a controller which reads the flow of current in a particular column wire and row wire as a result of pressing a keypad switch 12 and the controller outputs a value identifying a particular key to microcontroller 20. The microcontroller 20 is a programmable microcontroller as is known in the art. Using conventional microprocessor technology, the keypad controller, LED controller, sound generator, and shutdown timer can also be integrated into a single microcontroller. The LED array 14 also includes a controller which receives address values of LEDs to be turned ON from the microcontroller 20 and converts these into a cycle of ON/OFF pulses to the matrix of LEDs. As is known in the art, the matrix of LEDs are connected to common column and row wires such that any LED can be turned ON by provided an electrical connection to both its column and row wires. The LED array controller cycles through columns or rows in the matrix and turns ON the LEDs in the row or column for a fraction of the cycle with a sufficient frequency of the cycle that the LEDs being pulsed ON and OFF appear to be continuously ON. Such LED array controllers are also known to be able to control LED relative intensity by controlling the pulse width supplied to the LEDs.

The microcontroller 20 is connected to a rule memory 22 which provides the microcontroller with the logic tables for controlling the information display. The apparatus 10 also includes a touch memory interface 26 as is known in the art which permits information to be transferred between the microcontroller 20 and a portable memory device. A separate memory 24 is used to store inquiry statistics which can be used to provide data on how apparatus 10 was used and, more importantly, what types of products consumers were interested in. A timer 28 is also provided which is connected to microcontroller 20. When a key 12 has not been pressed for a predetermined period of time, for example, 30 seconds, the microcontroller may power down the LED array and any other circuits not required for operation until another key 12 is pressed.

In the preferred embodiment, apparatus 10 consists of five columns of four switches and LEDs, the first four columns 16 being for product characteristics and the fifth column being for products. There is a total of 16 product characteristic input switches and 16 LEDs which can be represented by a single 16 bit number, i.e. four ON/OFF bits for each column. As can be appreciated, a fourth product characteristic in the column for location, is shown as blank, however, the panel sheet 15 merely covers an LED 14 and switch 12 at the blank position in the matrix since there are only three characteristics for location. In the example of the preferred embodiment, the maximum number of LED combinations that are possible is $2^{16}$ or 65536. The LED indications in each column are mutually exclusive resulting in a total of $4^4$ or 64 possible combinations. Therefore, any combination of input columns can be represented by the n-tuple:

$$T=\{a,b,c,d: 0<=a<=3, 0<b<=3, 0<=c<=3, 0<-d<=3\}$$

wherein:

T=n-tuple representing the input a,b,c,d=corresponding bit number used in the 1st, 2nd, 3rd and 4th column respectively.

For applications that require the merging of two or more columns, for example, a case in which a grouping of product characteristics is greater than the number of elements in a particular column, the software in the microcontroller 20 can concatenate two or more columns and generate a different n-tuple, i.e. in the case that the first product characteristic group contains 15 elements with the second grouping having three elements and the third grouping having two elements, the switch status bit packing becomes:

$$T=\{a,b,c: 0<=a<=14, 0<=b<=2, 0<=c<=1\}.$$

The application software must be told in advance of the layout of the keypad. This is done by storing the keypad layout as an array inside the rule memory 22. Once the n-tuple has been formed, it is used as the output to an address hashing polynomial represented by:

$$H_a = \sum_{i=0}^{n} T_i W_i$$

wherein:

$H_a$=hashed address $T_i$=value of ith tuple, extracted from the n-tuple $W_i$=power of ith tuple, stored in the field installed rule memory 26 and n=number of groups used in the apparatus for a given promotion.

The $W_i$ array is stored in the rule memory 26 as an array of constants. For the keypad used in the preferred embodiment, the array would be $\{4^3, 4^2, 4^1, 4^0\}$, or $\{64, 16, 4, 1\}$. Once the n-tuple has been hashed, the resulting number is an address that is used to look into the rule memory 26 to extract the state of the LEDs to be displayed.

The operation of apparatus 10 can be summarized as follows. First, the keypad is scanned to look for a closed contact. If a contact closure is detected, the n-tuple is updated with the value of the new switch closure. The n-tuple is used to obtain the address hash. The address hash is used to obtain the status of the LED to be displayed. The output status array is updated and used by the LED array controller to display the LEDs on the display. The demographic or statistics memory 24 location corresponding to the value of the hashed memory address is incremented by one.

In the foregoing description of the rule memory according to the preferred embodiment, it can be appreciated that switch status bit packing allows for a condensed storage of the information required for the logical control of apparatus 10. Of course, if memory permits, ordinary tabular information providing, for example, a column for each product characteristic and a row for each product in which suitability information is stored in the table can be easily interpreted by the microcontroller to display which product or products are recommended based on product characteristic selection. The use of such a table also permits for the logic control to know whether a product characteristic selection has determined a unique product selection, as would be the case for a product characteristic which is only applicable to a single product. In such case, it would be possible for the logic controller to immediately jump to the step of turning on the LEDs for each product characteristic in the particular row of the recommended product, including the LED for the recommended product. For example, selection of the product characteristic of the material being wood could be immediately determined that white glue is the only suitable product and, as such, all other suitable product characteristic parameters regarding joint, location and bond type could be immediately displayed. In the preferred embodiment, selection of a product characteristic from each of the product characteristic groupings or columns 16 is required before a recommended product will be displayed.

As can be appreciated, apparatus 10 can have its rule memory 22 updated either by using a touch memory device 26 or by providing the apparatus 10 with a program mode switch. When the microcontroller 20 enters into the program mode, it records the pressing of keys 12 in the array and associates them with the pressing of a key in column 18 to generate the n-tuple value.

As can be appreciated, an optional sound generator 29 may be connected to the microcontroller which could generate one of a plurality of sounds or phrases either for the purposes of assisting the consumer in using the apparatus 10, or for sounding out loud the name of the recommended product or the product characteristics selected.

As can be appreciated, the LED array can be used in such a way that ideally recommended products are indicated by a full intensity LED while workable but less suitable products are illuminated with a lesser intensity. The LED array 14 may also comprise an array of color LEDs, which colour can be used to indicate a degree of product or product characteristic suitability or compatibility.

In the case of the preferred embodiment, the apparatus 10 is an independent item which is designed to be inexpensive and used by the consumer at the store shelf. The invention may also be adapted to a more sophisticated computer apparatus in situations where cost is less important. For example, when a consumer is considering a group of products for purchase remotely by an internet connection between the consumer and the retailer, the product characteristic selection means could comprise groupings of descriptive text portions or descriptive icons on a menu screen, while the display means for the selected product characteristics may display text or images describing the product characteristic, and the recommended product display means likewise may comprise a display of text or images identifying the recommended product on the computer screen.

We claim:

1. An information display apparatus comprising:
    an array of product characteristic selection means for inputting at least one selection of a plurality of product characteristics;
    an array of selected product characteristic display means for indicating selected ones of said plurality of product characteristics;
    an array of recommended product display means for indicating at least one of a plurality of products having said plurality of product characteristics;
    and logic means for determining at least one recommended product to be displayed based on said product characteristic selection, and for controlling said selected product characteristic display means and said recommended product display means to display selected ones of said plurality of product characteristics and said recommended product, wherein said logic means includes a programmable rule memory and said product characteristic selection means, said selected product characteristic display means and said recommended product display means are provided by a unitary array of keys, a plurality of label identifiers proximally associated with said keys, and a plurality of indicators proximally associated with said identifiers, said label identifiers and said indicators individually functioning either as said selected product characteristic display means or as said recommended product display means depending on programming of said rule memory.

2. The apparatus as claimed in claim 1, wherein said apparatus has a construction having a front surface, said product characteristic display means and said product display means comprise an array of flat keys on said front surface, said plurality of associated label identifiers being provided on said front surface, and said indicators comprising a plurality of LEDs.

3. The apparatus as claimed in claim 2, wherein said labels are provided by a label sheet covering said front surface.

4. The apparatus as claimed in claim 3, wherein said sheet is replaceable, whereby said information display apparatus may be used for different products.

5. The apparatus as claimed in claim 1, further comprising an array of product selection means for selecting one of said plurality of products, said logic means determining which ones of said product characteristics are associated with said selected product and controlling said selected product characteristic display means to display determined ones of said plurality of product characteristics which can be associated with said selected product.

6. The apparatus as claimed in claim 5, wherein said apparatus has a construction having a front surface, said product characteristic selection means and said product selection means, comprising an array of flat keys on said front surface, said selected product characteristic display means and said recommended product display means comprising a plurality of label identifiers on said front surface and an associated plurality of LEDs.

7. The apparatus as claimed in claim 5, wherein labels are provided by a label sheet covering said front surface.

8. The apparatus as claimed in claim 7, wherein said sheet is replaceable, said logic means being reprogrammable, whereby said information display apparatus may be used for different products.

9. The apparatus as claimed in claim 1, wherein for the purposes of demographic calculations, said logic means record data on at least one of said at least one selection of said plurality of product characteristics input and said at least one recommended product displayed, whereby the public's interest in gaining information about the plurality of products in the group is obtained and used for marketing purposes.

10. The apparatus as claimed in claim 2, wherein for the purposes of demographic calculations, said logic means record data on at least one of said at least one selection of said plurality of product characteristics input and said at least one recommended product displayed, whereby the public's interest in gaining information about the plurality of products in the group is obtained and used for marketing purposes.

11. The apparatus as claimed in claim 5, wherein for the purposes of demographic calculations, said logic means record data on at least one of said at least one selection of said plurality of product characteristics input and said at least one recommended product displayed, whereby the public's interest in gaining information about the plurality of products in the group is obtained and used for marketing purposes.

12. The apparatus as claimed in claim 1, further comprising a sound generating device connected to said logic means for providing small quantities of audio information, whereby said information can be used to provide help to a user in using the apparatus or provide selected product characteristics or selected product information.

13. The apparatus as claimed in claim 1, further comprising a touch memory interface means for programming said logic means.

14. The apparatus as claimed in claim 2, further comprising a touch memory interface means for programming said logic means.

15. The apparatus as claimed in claim 5, further comprising a touch memory interface means for programming said logic means.

16. An information display apparatus comprising:

an array of product characteristic selection means for inputting at least one selection of a plurality of product characteristics;

an array of selected product characteristic display means for indicating selected ones of said plurality of product characteristics;

an array of recommended product display means for indicating at least one of a plurality of products having said plurality of product characteristics;

and logic means for determining at least one recommended product to be displayed based on said product characteristic selection, and for controlling said selected product characteristic display means and said recommended product display means to display selected ones of said plurality of product characteristics and said recommended product, wherein for the purposes of demographic calculations, said logic means comprises means for recording data on at least one of said at least one selection of said plurality of product characteristics input and said at least one recommended product displayed, whereby the public's interest in gaining information about the plurality of products in the group is obtained and used for marketing purposes.

17. An information display apparatus comprising:

an array of product characteristic selection means for inputting at least one selection of a plurality of product characteristics;

an array of selected product characteristic display means for indicating selected ones of said plurality of product characteristics;

an array of recommended product display means for indicating at least one of a plurality of products having said plurality of product characteristics;

and logic means for determining at least one recommended product to be displayed based on said product characteristic selection and for controlling said selected product characteristic display means and said recommended product display means to display selected ones of said plurality of product characteristics and said recommended product, and further comprising;

an array of product selection means for selecting one of said plurality of products, said logic means determining which ones of said product characteristics are associated with said selected product and controlling said selected product characteristic display means to display determined ones of said plurality of product characteristics which can be associated with said selected product.

* * * * *